United States Patent
Dendy et al.

(10) Patent No.: US 9,231,984 B1
(45) Date of Patent: Jan. 5, 2016

(54) SYSTEMS AND METHODS FOR HAIR PINNING TIME-DIVISION MULTIPLEXING CALLS ACROSS TIME DOMAINS

(75) Inventors: Scott William Dendy, Arab, AL (US); Haibiao Zheng, Madison, AL (US); Patrick Andrew Price, Madison, AL (US)

(73) Assignee: ADTRAN, Inc., Huntsville, AL (US)

( * ) Notice: Subject to any disclaimer, the term of this patent is extended or adjusted under 35 U.S.C. 154(b) by 400 days.

(21) Appl. No.: 13/531,134

(22) Filed: Jun. 22, 2012

(51) Int. Cl.
*H04L 12/66* (2006.01)
*H04L 29/06* (2006.01)

(52) U.S. Cl.
CPC ......... *H04L 65/102* (2013.01); *H04L 29/06176* (2013.01)

(58) Field of Classification Search
None
See application file for complete search history.

(56) References Cited

U.S. PATENT DOCUMENTS

| | | | |
|---|---|---|---|
| 6,798,784 B2 | 9/2004 | Dove et al. | |
| 6,876,678 B1 | 4/2005 | Chow et al. | |
| 7,006,497 B2 | 2/2006 | Dove et al. | |
| 7,158,540 B1 | 1/2007 | Stiles et al. | |
| 2004/0170167 A1 | 9/2004 | Cohen | |
| 2005/0220059 A1 | 10/2005 | DelRegno et al. | |
| 2006/0268832 A1* | 11/2006 | Mekala | H04J 3/14 370/352 |
| 2008/0117807 A1* | 5/2008 | Davidson | H04L 41/0663 370/219 |
| 2009/0252155 A1* | 10/2009 | Masuya | H04L 12/66 370/352 |
| 2010/0189094 A1* | 7/2010 | Gray | H04L 12/66 370/352 |
| 2011/0149777 A1* | 6/2011 | Robbins | H04L 49/201 370/252 |
| 2011/0249675 A1* | 10/2011 | O'Brien | H04Q 11/0478 370/392 |

OTHER PUBLICATIONS

Alcatel, "Alcatel's Packet-Based Digital Cross-Connect Switch Application," www.acatel.com.
Adtran, "Total Access 5000 T1 8-port Line Module," pp. 1-2.

\* cited by examiner

*Primary Examiner* — Kwang B Yao
*Assistant Examiner* — Hardikkumar Patel
(74) *Attorney, Agent, or Firm* — Maynard Cooper & Gale, P.C.; Jon E. Holland

(57) ABSTRACT

A system for hair pinning-time division multiplexing (TDM) calls has a gateway positioned between a non-TDM network and communication equipment coupled to the gateway via a plurality of TDM lines. The gateway has a plurality of signal processing elements configured to encapsulate the TDM call data into a plurality of packets utilizing a protocol suitable for transmission through the network, and each signal processing element has its own time domain such that the signal processing elements operate asynchronously. The gateway also has a central processing element configured to forward the packets to the network via the network protocol. The central processing element is further configured to identify packets which are mapped to channels of TDM lines coupled to the gateway and to forward the packets to the appropriate signal processing element for transmission through the appropriate TDM channel. Accordingly, hair pinning across asynchronous time domains is achieved within the gateway.

18 Claims, 7 Drawing Sheets

SYSTEMS AND METHODS FOR HAIR PINNING TIME-DIVISION MULTIPLEXING CALLS ACROSS TIME DOMAINS

RELATED ART

Communication systems often comprise gateways positioned between a network, such as, for example, an internet protocol (IP) network, and communication equipment, such as, for example, telephones or computing devices. The communication equipment often transmits a data signal via communication protocols and formats that are different from those used in the network. Thus, the gateway converts the data signal into a form that is suitable for transmission to the network.

One communication technique sometimes used by the communication equipment is time-division multiplexing (TDM), wherein TDM voice calls are transmitted across a TDM line, such as a T1 or E1. Often, one or more TDM lines are coupled to a gateway, and a plurality of channels are communicated across each TDM line. A TDM voice call can be carried by one or more of the channels of a TDM line, and such comprises both voice data and telephone signaling information that is used to establish and maintain a session between a destination device and a telephone from which the call originated. If the gateway serves a packet network, such as the Internet, the gateway converts the TDM call data into data packets that are compatible with the network. As the use of the packet network grows, it is generally desirable for packets to be processed efficiently to reduce network congestion and conserve the resources of the network.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Embodiments of the present disclosure generally pertain to systems and methods for hair pinning time-division multiplexing (TDM) calls across time domains. An exemplary system for hair pinning TDM calls across time domains comprises a gateway positioned between a non-TDM network and a plurality of communication equipment. Each set of communication equipment is coupled to the gateway via a TDM line, and the communication equipment is configured to establish TDM calls through the gateway via such TDM line. The gateway comprises a plurality of signal processing elements configured to encapsualte TDM call data into a plurality of packets utilizing a protocol suitable for transmission through the network, and each signal processing element has its own time domain such that the signal processing elements operate asynchronously. The gateway also comprises a central processing element configured to receive and forward the packets to the network via the network protocol. The central processing element is further configured to identify packets which are mapped to channels of TDM lines coupled to the gateway and to forward the packets to the appropriate signal processing element for transmission through the appropriate TDM channel. Accordingly, hair pinning across asynchronous time domains is achieved within the gateway.

Figure 1:
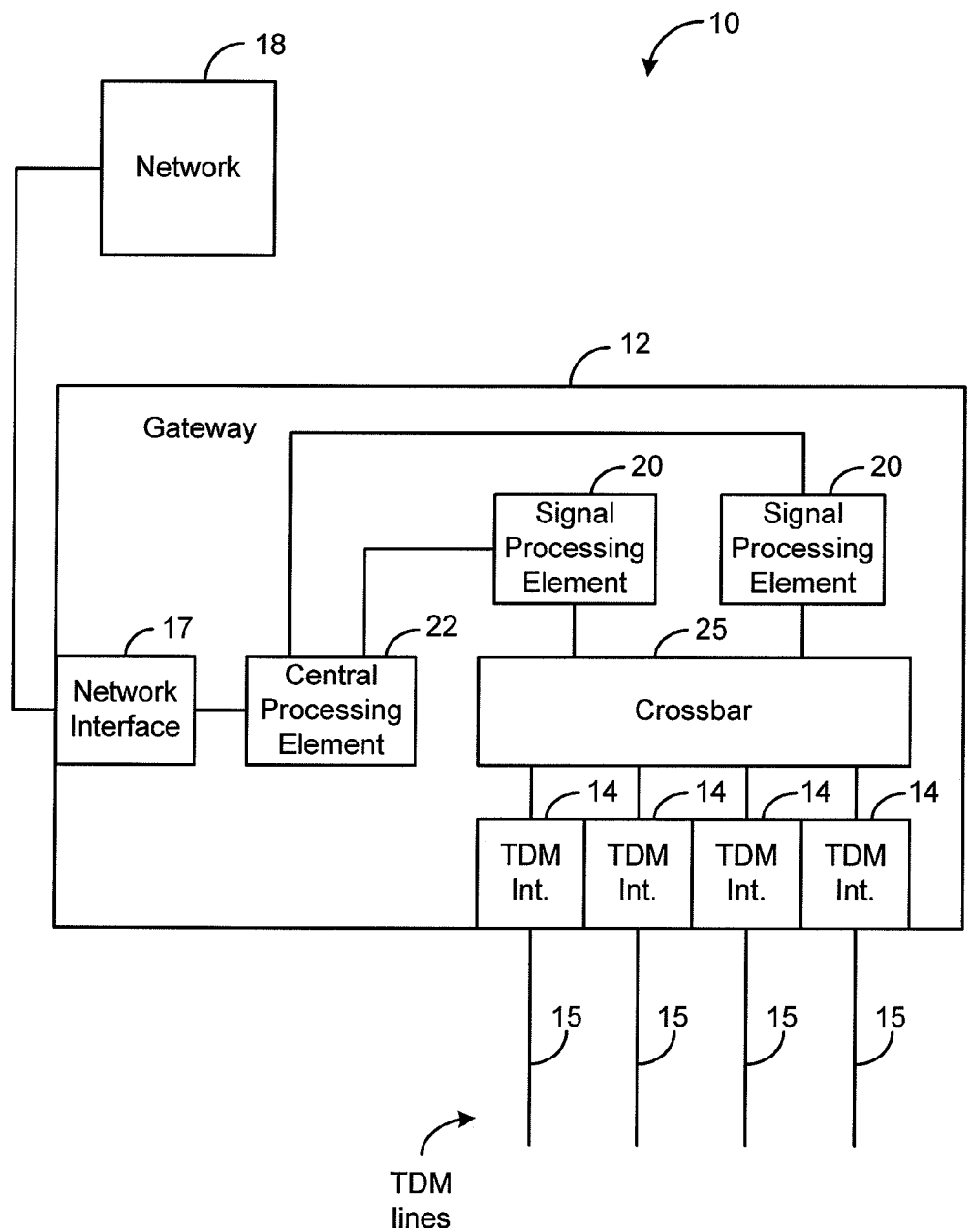
FIG. 1 is a block diagram illustrating a conventional communication system having a gateway coupled between a packet network and a plurality of TDM lines.

FIG. 1 depicts a conventional communication system 10 utilizing a conventional gateway 12. The conventional gateway 12 has a plurality of TDM interfaces 14 coupled to TDM lines 15, such as, for example, T1s or E1s. The TDM lines 15 extend from communication equipment (not shown in FIG. 1) to the gateway 12, and the TDM lines 15 transmit various types of data, including digitized TDM voice calls, from the equipment to the TDM interfaces 14. Each TDM line 15 communicates a plurality of TDM channels separated by time. As an example, as known in the art, a standard T1 line communicates 24 channels at an aggregate rate of 1.544 Mbps, but other numbers of channels and data rates are possible.

The gateway 12 further comprises a network interface 17, such as, for example, an Ethernet interface, coupled to a non-TDM network 18. In one example, the network 18 comprises an internet protocol (IP) network, although the network 18 may comprise any type of communication network in other examples. Furthermore, the gateway 12 comprises a plurality of signal processing elements 20 coupled to a central processing element 22. Each signal processing element 20 comprises a digital signal processor (DSP), and the central processing element 22 comprises a central processing unit (CPU). However, other types of signal processing elements 20 and central processing elements 22 are possible. The signal processing elements 20 are configured to perform conversions between the applicable TDM protocol and the network protocol, such as, for example, IP, in order to allow the TDM calls to be routed through the network 18.

Furthermore, the gateway 12 comprises a hardware cross-connect switch 25, referred to as a "crossbar," positioned between the TDM interfaces 14 and the signal processing elements 20. The crossbar 25 is configured to map the TDM calls to the appropriate path, such as to a particular signal processing element 20. Due to such mapping, any of the signal processing elements 20 can terminate any of the TDM channels transmitted via any of the TDM lines 15. In addition, it is possible for the crossbar 25 to map a TDM call received from one TDM line 15 to a channel of the same TDM line 15 or another TDM line 15 coupled to the gateway 12. In such case, rather than converting the TDM call into packets utilizing the network protocol, such as IP packets, and sending the packets to the network 18 (which would ultimately return the packets to the gateway 12), the crossbar 25 instead maps the TDM call directly to the appropriate TDM interface 14. Thus, the TDM call is not sent to the network 12, and network bandwidth is conserved. Such a process of forwarding a TDM call to a TDM interface 14 for transmission across a TDM line 15 of the same gateway 12 without forwarding the TDM call to the network 18 is generally referred to as "hair pinning"

However, a drawback of the conventional gateway 12 is that each TDM interface 14 is required to operate synchronously (e.g., in the same time domain) due to the presence of the crossbar 25, which is typically not designed to account for timing differences between the resources coupled to it. Thus, for example, the gateway 12 may be required to have a clock (not shown) that is used to synchronize the resources coupled to the crossbar 25, or each TDM interface 14 may be required to share a clock signal that is extracted from one of the data streams received by the TDM interfaces 14. Requiring each TDM interface 14 to operate synchronously can be burdensome to a service provider that is responsible for establishing and maintaining the TDM lines 15.

Figure 2:
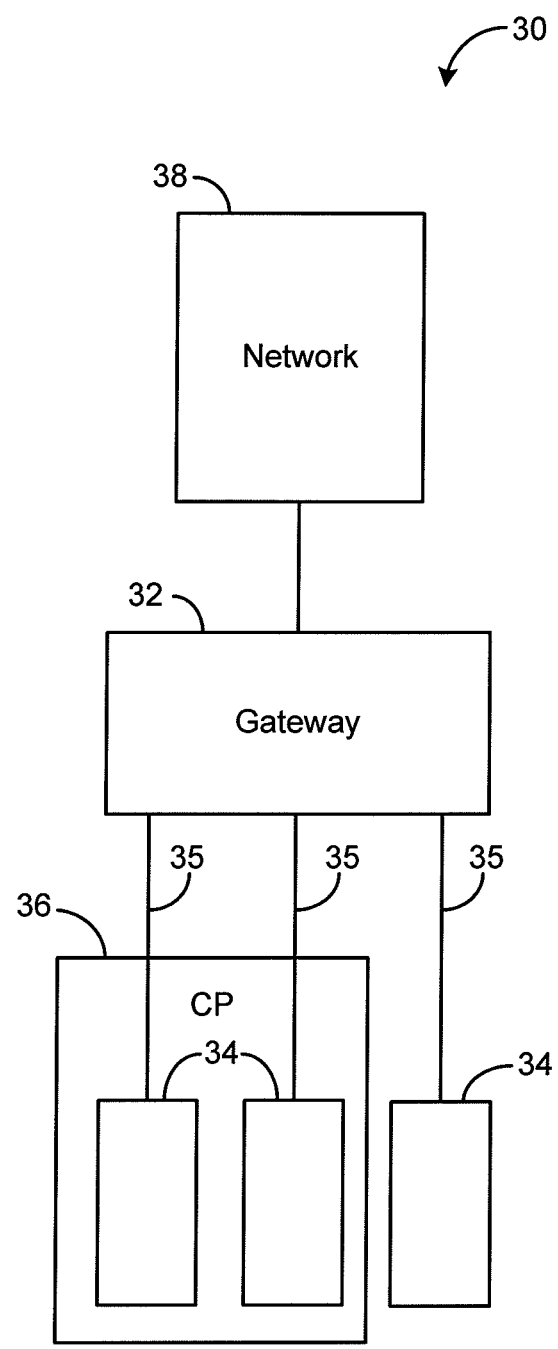
FIG. 2 is a block diagram illustrating an exemplary embodiment of a communication system that has a gateway coupled between a packet network and a plurality of TDM lines.

FIG. 2 depicts an exemplary gateway 32 utilized in a communication system 30. The gateway 32 is coupled to communication equipment 34 via a plurality of TDM lines 35. The communication equipment 34, such as, for example, telephones or computing devices, may be located at customer premises (CP) 36 or at a remote location between the gateway 32 and one or more CPs 36. Each set of communication equipment 34 is configured to transmit various types of data, such as digitized TDM voice calls, to the gateway 32 via a respective one of the TDM lines 15, such as a T1 or E1.

The gateway 32 is also coupled to a non-TDM network 38, such as, for example, an IP network (e.g., the Internet). The gateway 32 is configured to receive TDM calls from the communication equipment 34 via the TDM lines 35 and to convert data from the TDM calls into data packets utilizing protocols suitable for transmission through the network 38. For example, if the network 38 comprises an IP network, the gateway 32 converts each TDM call into a plurality of IP packets for transmission through the network 38. However, other types of networks 38 and network protocols are possible. The gateway 32 is further configured to forward packets between the network 38 and the communication equipment 34. Thus, the gateway 32 receives a TDM call from a TDM line 35, converts the TDM call into one or more packets for transmission through the network 38, and forwards the packets to the network 38.

Furthermore, the gateway 32 is configured to perform hair pinning across asynchronous time domains. Thus, if the gateway 32 receives a TDM call from a TDM line 35 operating in one time domain, the gateway 32 can forward the TDM call to a channel of another TDM line 35 that is operating in a different time domain, as will be discussed in more detail hereafter. Accordingly, the gateway 32 performs hair pinning of TDM calls even when the TDM lines 35 are operating asynchronously.

Figure 3:
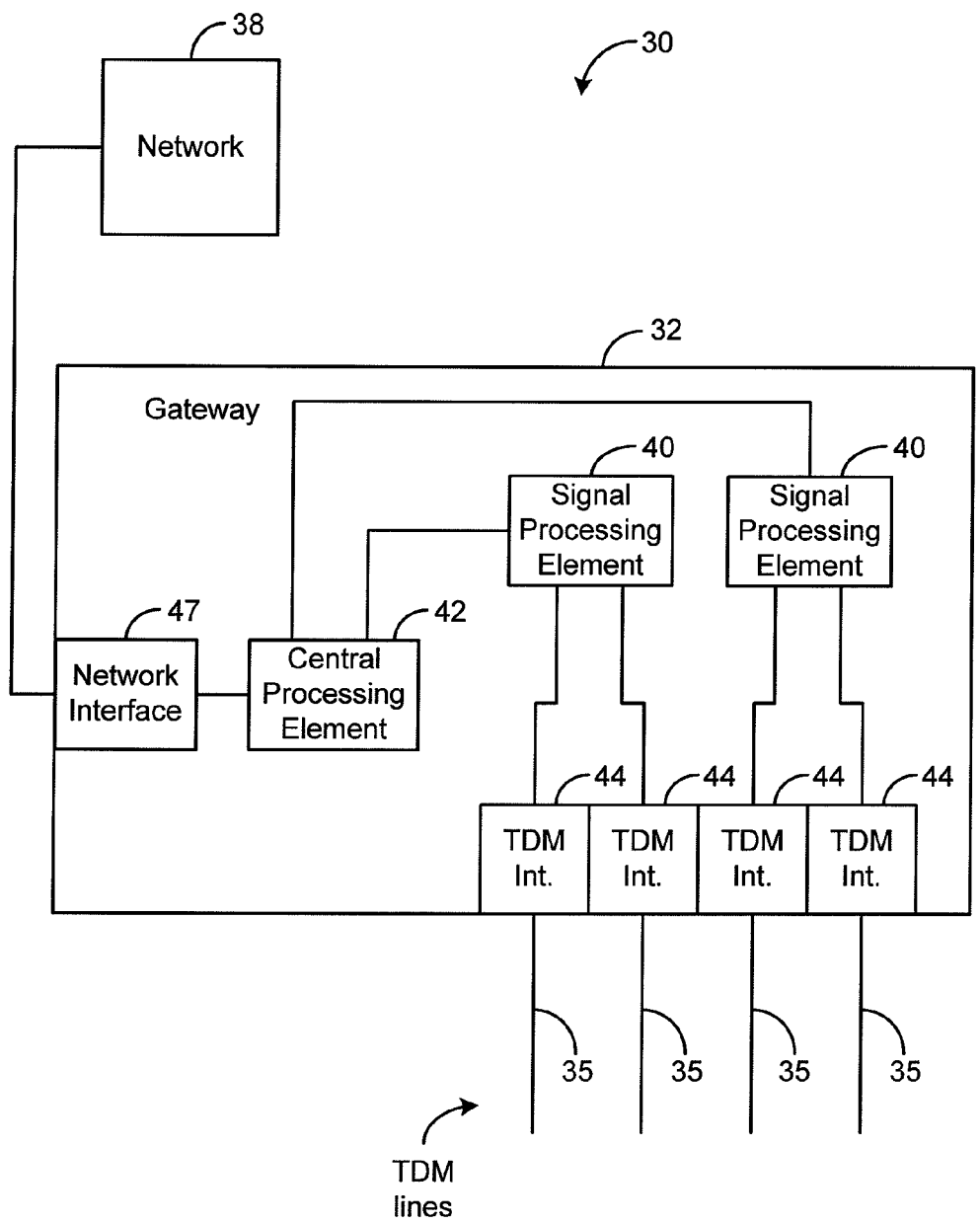
FIG. 3 is a block diagram depicting an exemplary embodiment of a gateway, such as is depicted by FIG. 2.

FIG. 3 depicts an exemplary embodiment of the gateway 32 shown by FIG. 2. Like the conventional gateway 12 of FIG. 1, the gateway 32 comprises a plurality of signal processing elements 40, a central processing element 42, a plurality of TDM interfaces 44, and a network interface 47. However, as shown by FIG. 3, the crossbar 25 (FIG. 1) has been eliminated from the design of the exemplary gateway 32. Thus, each TDM interface 44 is coupled to a respective TDM line 35, and each signal processing element 40 is coupled to one or more TDM interfaces 44 and terminates a respective set of TDM lines 35. Each signal processing element 40 is also coupled to the central processing element 42. In one embodiment, each signal processing element 40 is coupled to the central processing element 42 via an Ethernet bus and communicates with the central processing element 40 via Ethernet protocols, but other coupling means and communication protocols are possible in other embodiments.

In one embodiment, each signal processing element 40 comprises a DSP, and the central processing element 42 comprises a CPU, although different types of signal processing elements 40 and/or central processing elements 42 are possible in other embodiments. The central processing element 42 is also coupled to the network interface 47, such as, for example, an Ethernet interface having an Ethernet transceiver (not specifically shown) for communicating with the network 35. The network interface 47 is coupled to the network 38 which, as set forth above, may comprise an IP network in one embodiment. However, other types of networks 38 are possible in other embodiments. In one embodiment, the components of the gateway 32 are integrated and situated within a housing (not shown in FIG. 3), discussed in more detail hereafter, although the components of the gateway 32 may be non-integrated and/or located in different housings in other embodiments. In one embodiment, the components of the gateway 32 reside on a single printed circuit board (PCB), but multiple PCBs may be used, if desired.

It is significant to note that each signal processing element 40 has its own time domain. Thus, a set of TDM lines 35 coupled to one signal processing element 40 are asynchronous to a set of TDM lines 35 coupled to a different signal processing element 40. Each signal processing element 40 is configured to convert data from the TDM lines 35 coupled to it into data packets suitable for transmission through the network 38. For example, if the network 38 comprises an IP network, each signal processing element 40 encapsulates data from its respective TDM lines 35 (e.g., digitized TDM voice calls) into IP packets. The packets are transmitted from the signal processing elements 40 to the central processing element 42.

The central processing element 42 is configured to receive packets, determine the respective destination of the packets, and forward the packets to their appropriate destinations based on overhead information in the packets. Normally, upon receiving a packet from a signal processing element 40, the central processing element 42 transmits the packet to the network interface 47 for transmission to the network 38. However, if the central processing element 42 determines that the packet is from a TDM call that is to be forwarded to another TDM line 35 coupled to the gateway 32, the element 42 forwards the packet directly to the appropriate signal processing element 40 without transmitting the packet to the network 38. That is, the central processing element 42 hair pins the packet. The signal processing element 40 that receives the hair pinned packet converts the packet back into a format suitable for transmission across the TDM line 35. Accordingly, the data of the hair pinned TDM call does not consume resources external to the gateway 32 on the network side of the communication system 30.

Note that, although the central processing element 42 manages the hair pinning operations of the gateway 32 of FIG. 3, hair pinning may be performed directly between the signal processing elements 40 in other embodiments. For example, in one embodiment, one signal processing element 40 may hair pin TDM calls with respect to TDM lines 35 coupled to the element 40, or the element 40 may pass the calls directly to the other signal processing element 40 as desired to perform hair pinning within the gateway 32. In this embodiment, each signal processing element 40 has access to TDM mapping data (not shown in FIG. 3), discussed in more detail hereafter, which allows the element 40 to forward the TDM calls to the appropriate destinations.

Notably, the hair pinning performed by the gateway 32 can cross time domains within the gateway 32. That is, data packets from a signal processing element 40 operating in one time domain may be forwarded to another signal processing element 40 that is operating in a different time domain. Thus, hair pinning is not restricted to synchronous TDM interfaces 44. Furthermore, each signal processing element 40 has a jitter buffer (not shown in FIG. 3), discussed in more detail hereafter, that receives packets from the central processing element 42 and compensates for timing differences between different time domains within the gateway 32.

Figure 4:
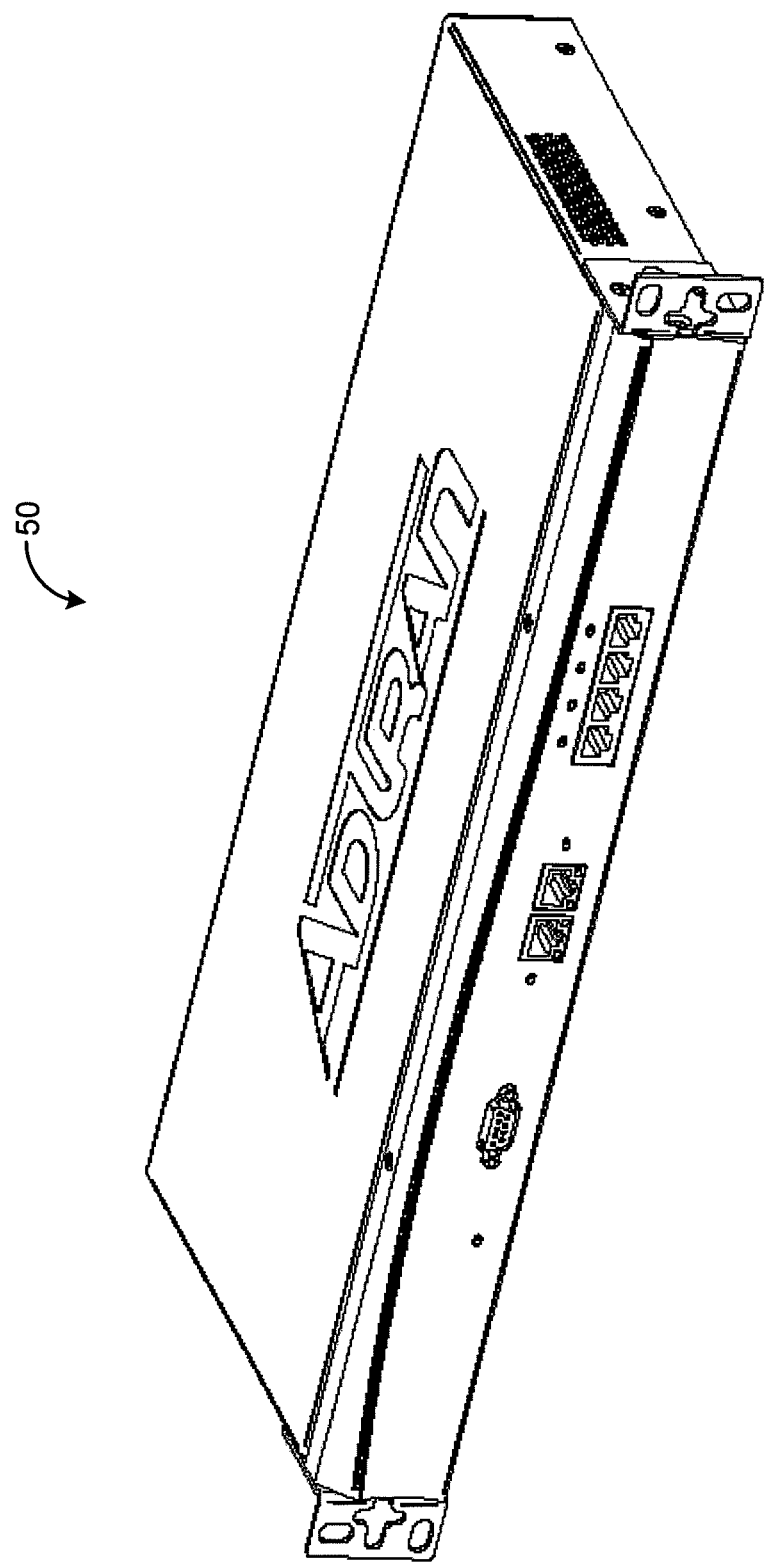
FIG. 4 depicts an exemplary embodiment of a housing for housing a gateway, such as is depicted by FIG. 2.

FIG. 4 depicts an exemplary housing 50 for housing components of the exemplary gateway 32 of FIG. 2. As set forth above, in one embodiment, the components of the gateway 32 are integrated and housed within a single housing 50. Thus, hair pinning of TDM calls can be achieved entirely within the housing 50 thereby conserving valuable network resources external to the housing 50.

Figure 5:
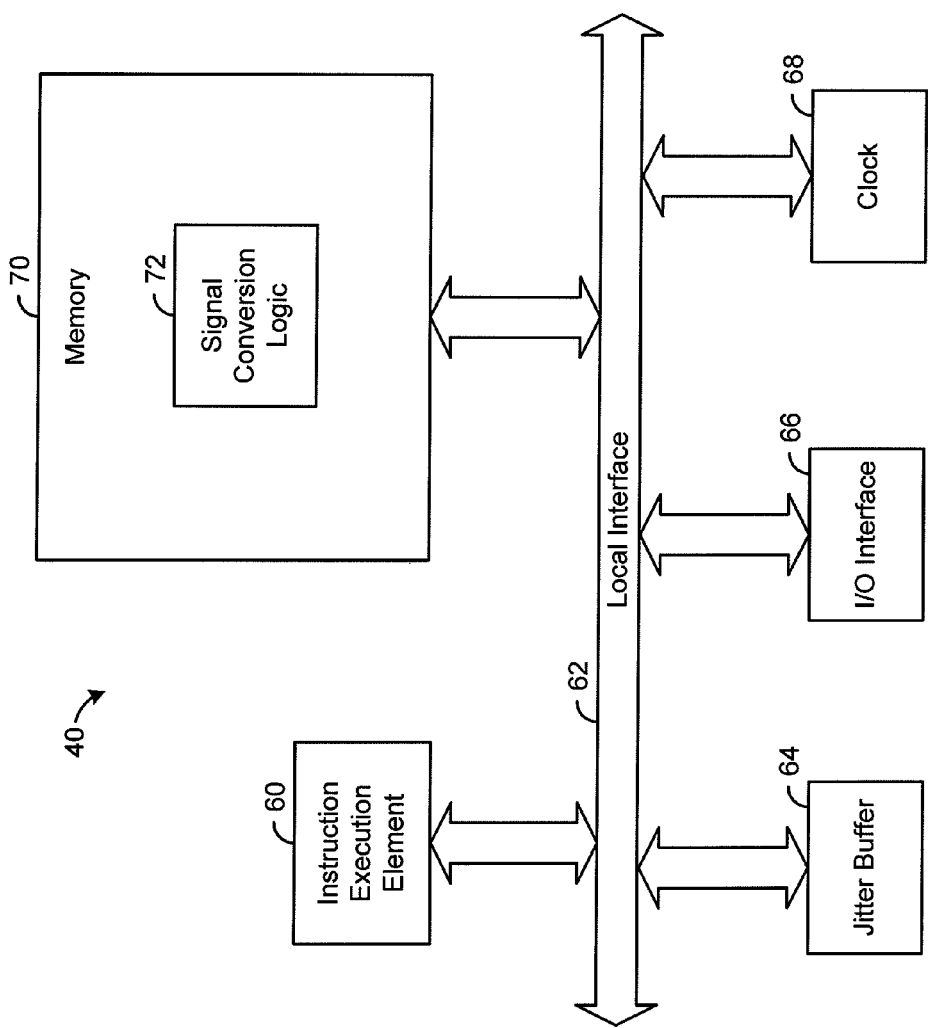
FIG. 5 is a block diagram depicting an exemplary embodiment of a signal processing element, such as is depicted by FIG. 3.

FIG. 5 depicts an exemplary embodiment of a signal processing element 40, such as is depicted by FIG. 3. As set forth above, the signal processing element 40 is configured to perform conversions between TDM formats and the network protocol in order to facilitate the forwarding of TDM calls through the network 38 (FIG. 2). The signal processing element 40 is further configured to detect call control information, such as, for example, call setup or call disconnect information, received from the TDM lines 35 coupled to it and to digitally transmit the call control information to the central processing element 42 (FIG. 3). In one embodiment, the signal processing element 40 comprises signal conversion logic 72 configured to manage the encapsulation of TDM data into packets utilizing the network protocol, as well as the deencapsulation of packets from the network 38 into TDM data for transmission across the TDM lines 35. It should be noted that the signal conversion logic 72 can be implemented in software, hardware, firmware or any combination thereof. In an exemplary embodiment illustrated in FIG. 5, the signal conversion logic 72 is implemented in software and stored in memory 70 of the signal processing element 40.

Note that the signal conversion logic 72, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The exemplary embodiment of the signal processing element 40 depicted by FIG. 5 comprises at least one instruction execution element 60, such as a digital signal processor (DSP) or a central processing unit (CPU), that communicates to and drives the other elements within the element 40 via a local interface 62, which can include at least one bus. Furthermore, an input/output (I/O) interface 66, for example, one or more data ports, can be used to transmit or receive data to or from the central processing element 42 and can also be used to transmit or receive data to or from one or more of the TDM interfaces 44.

The signal processing element 40 further comprises a jitter buffer 64 configured to receive data packets from the central processing element 42, and buffer the packets such that the timing of the packets on ingress does not need to be synchronized with the internal time domain of the signal processing element 40. Accordingly, it is unnecessary for the signal processing element 40 to operate synchronously with the other signal processing element 40 in order to receive and process packets derived from such other signal processing element 40. In one embodiment, as shown by FIG. 5, each signal processing element 40 comprises a clock 68 for generating a clock signal that controls the element's time domain. In an alternative embodiment, the signal processing element 40 may be configured to derive a clock signal from a data stream received from a TDM line 35 coupled to it. Other techniques for controlling the timing of the signal processing element 40 are possible in other embodiments. Note that the clock 68 of the signal processing element 40 is independent from the clock (not shown) of every other signal processing element 40 in the gateway 32 (FIG. 2) such that all of the elements 40 operate asynchronously. However, as described above, each signal processing element 40 has a jitter buffer 64 that allows it to accept packets from a different time domain without losing data.

Figure 6:
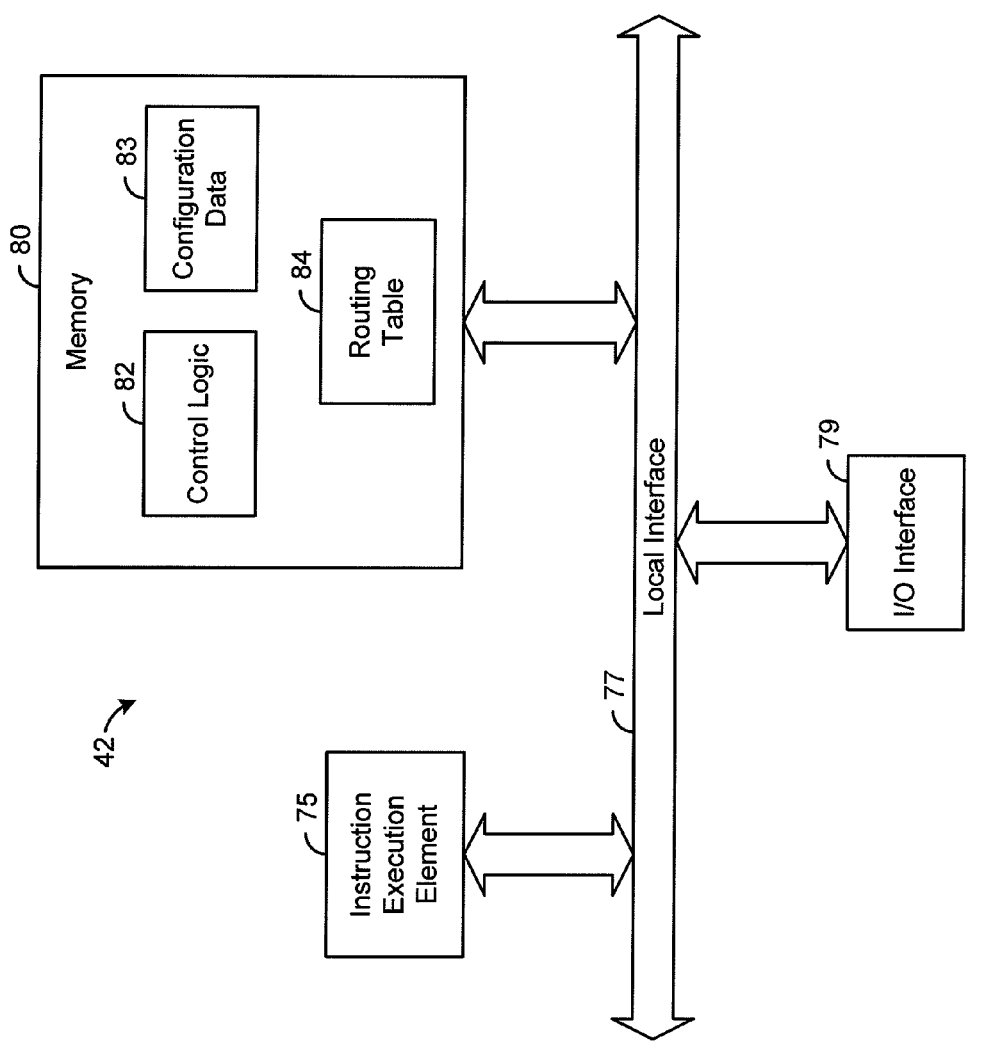
FIG. 6 is a block diagram depicting an exemplary embodiment of a central processing element, such as is depicted by FIG. 3.

FIG. 6 depicts an exemplary embodiment of the central processing element 42, such as is depicted by FIG. 3. The central processing element 42 comprises an instruction execution element 75, such as a CPU or DSP, that communicates to and drives the other elements within the element 42 via a local interface 77. Furthermore, the central processing element 42 comprises an I/O interface 79, such as, for example, one or more data ports, for facilitating communication between the element 42 and the other elements of the gateway 32, such as the network interface 47 and signal processing elements 40 (FIG. 3). The I/O interface 79 also facilitates communication between the element 42 and the signal processing elements 40 (FIG. 3).

In one embodiment, the central processing element 42 comprises control logic 82 configured to manage forwarding of data packets between the signal processing elements 40 and the network 38 (FIG. 3). It should be noted that the control logic 82 can be implemented in software, hardware, firmware or any combination thereof. In an exemplary embodiment illustrated in FIG. 6, the control logic 82 is implemented in software and stored in memory 80 of the central processing element 42. Note that the control logic 82, when implemented in software, can be stored and transported on any computer-readable medium for use by or in connection with an instruction execution apparatus that can fetch and execute instructions.

The control logic 82 determines the TDM call's destination based on call signaling information received by the gateway 32 from a call originating device. For calls to be hair pinned, both the call originating device and the call destination device are coupled to the gateway 32 through a respective TDM line 35. The call signaling information is digitally transmitted to the central processing element 42, which uses such information to manage the call. For example, when a call is initiated by the call originating device, the call signaling information indicates call setup and contains the destination phone number that was dialed or otherwise input by a user of the call originating device. The central processing element 42 further comprises configuration data 83 stored in the memory 80 of the element 42. The configuration data 83 indicates phone numbers for devices utilizing TDM lines 35 (FIG. 3) coupled to the signal processing elements 40 (FIG. 2) located within the gateway 32 (FIG. 2). During call setup, the control logic 82 compares the call setup information to the configuration data 83 in order to determine how to forward the packets of the TDM call. The control logic 82 then sets up an inbound channel and an outbound channel for the TDM call data.

In this regard, the control logic 82 selects an available TDM channel of the line 35 from which the initial call setup information, and allocates such channel, referred to as the "inbound channel," for the TDM call. The signal processing element 40 that is coupled to the foregoing line 35 and that services the inbound channel shall be referred to hereafter as the "source signal processing element."

If the logic 82 determines that the destination phone number matches a phone number in the configuration data 83, the logic 82 determines that the TDM call is destined for a TDM channel of a TDM line 35 coupled to a signal processing element 40 of the gateway 32 (e.g., the TDM call is to be hair pinned). In such case, the logic 82 selects an available TDM channel of the line 35 coupled to the call destination device (i.e., the device identified by the foregoing telephone number in the call signaling information) and allocates such channel, referred to hereafter as the "outbound channel," for the TDM call. The signal processing element 40 that is coupled to the foregoing line 35 and that services the outbound channel shall be referred to hereafter as the "destination signal processing element."

Thus, for a TDM call that is to be hair pinned, the control logic 82 sets up inbound and outbound channels through which the TDM call data is transmitted. Note that the same signal processing element 40 may serve as both the source signal processing element and the destination signal processing element, such as when the same signal processing element 40 is coupled to and services both the call originating device and the call destination device. Unless otherwise noted herein, it will be assumed hereafter that the source signal processing element 40 and the destination signal processing element 40 are different (i.e., that the call originating device and call destination device are respectively coupled to and serviced by different signal processing elements 40).

In addition to setting up the inbound and outbound channels, the control logic 82 configures the source signal processing element 40 to encapsulate the TDM call data from the call originating device into packets compatible with the network 38 (e.g., IP packets). Further the control logic 82 configures the source signal processing element 40 to insert into the header of each such packet the IP address of the destination signal processing element 40 and the port identifier for the outbound channel for the call.

Note that, for each TDM channel serviced by the gateway 32, the combination of the IP address of the channel's signal processing element 40 and port identifier uniquely identifies within the gateway 32 the TDM channel. All of the traffic for the same TDM channel flows through the same port of a signal processing element 40, and such signal processing element 40 can control which channel carries outgoing traffic by controlling from which port the traffic egresses. In other embodiments, other identifiers for the channels and/or techniques for controlling traffic flow may be used.

Similarly, the central processing element 42 configures the destination signal processing element 40 to encapsulate the TDM call data from the call destination device into data packets compatible with the network 38 (e.g., IP packets). Further, the central processing element 42 configures the destination signal processing element 40 to insert into the header of each such packet the IP address of the source signal processing element 40 and the port identifier for the inbound channel.

Thereafter, during the TDM call, TDM data is received by the source signal processing element 40 from the inbound channel. Such element 40 packetizes the TDM data into IP packets and transmits the IP packets via Ethernet protocol to the central processing element 42. In addition, TDM data is received by the destination signal processing element 40 from the outbound channel. Such element 40 packetizes the TDM data into IP packets and transmits the IP packets via Ethernet protocol to the central processing element 42. The control logic 82 of the central processing element 42 forwards the packets from the source signal processing element 40 directly to the destination signal processing element 40 and vice versa based on comparisons of the IP addresses inserted by the signal processing elements 40 and a routing table 84 stored in the memory 80.

In this regard, the routing table 84 maps the IP address of the destination signal processing element 40 to the media access control (MAC) address of such element 40, and the routing table maps the IP address of the source signal processing element 40 to the MAC address of such element 40. As described above, in one embodiment, the signal processing elements 40 communicate with the central processing element 42 via Ethernet protocols, and the central processing element 42 uses the routing table 84 to find the MAC address of the appropriate signal processing element 40 to forward packets. Thus, using the routing table 84, packets from the source signal processing element 40 are forwarded to the destination processing element 40, which deencapsulates such packets to recover the TDM call data that is to be transmitted via the call's outbound channel. In addition, packets from the destination signal processing element 40 are forwarded to the source signal processing element 40, which deencapsulates such packets to recover TDM call data that is to be transmitted via the call's inbound channel. Accordingly, the central processing element 42 manages hair pinning of TDM calls, including packet forwarding, without consuming network resources external to the gateway 32.

Note that if a particular TDM call originating through one of the TDM lines 35 is not to be hair pinned (i.e., the call destination device is not connected to the gateway 32 through one of the TDM lines 35), then the central processing element 42 sets up the inbound channel, similar to the techniques described above. However, the central processing element 42 does not set up the outbound channel through one of the signal processing elements 40. In such case, when the central processing element 42 receives a packet from the inbound channel, the signal processing element 42 forwards the packet to the network interface 47 for transmission to the network 38.

An exemplary operation and use of the gateway 32 (FIG. 3) will now be described with particular reference to FIG. 7.

When a TDM call originates via a TDM line 35, the signal processing element 40 (referred to as the "source signal processing element") coupled to such line 35 receives call signaling information for the call and forwards such information to the central processing element 42, which sets up the call. In this regard, upon receiving call signaling information, the control logic 82 (FIG. 6) of the central processing element 42 determines whether the call is to be hair pinned, as shown by blocks 100 and 102 of FIG. 7. In particular, the configuration data 83 is provisioned to indicate a list of telephone numbers that are accessible through the TDM lines 35, and the data 83 maps each such telephone number to the IP address of the signal processing element 40 that services the call destination device identified by the telephone number. The control logic 82 accesses the configuration data 83 to determine whether the destination phone number in the call signaling information matches a phone number in the configuration data 83 indicating that the call is destined for a TDM channel of a TDM line 35 coupled to the gateway 32. If so, the call is to be hair pinned, and the control logic 82 internally sets up both an inbound and an outbound channel, as shown by block 106 of FIG. 7.

In this regard, the control logic 82 allocates a TDM channel of the source signal processing element 40 (which is coupled to and services the call originating device) as the inbound channel, and the control logic allocates a TDM channel of the destination signal processing element 40 (which is coupled to and services the call destination device) as the outbound channel. The control logic 82 further configures the source signal processing element 40 to encapsulate TDM call data received from the inbound channel into IP packets that have the IP address of the destination signal processing element 40 and the port identifier for the outbound channel. The control logic 82 also configures the destination signal processing element 40 to encapsulate TDM call data received from the outbound channel into IP packets that have the IP address of the source signal processing element 40 and the port identifier for the inbound channel. As shown by block 108 of FIG. 7, the central processing element 22 further completes call setup, as may be appropriate, to ensure that call data successfully flows through the gateway 32, similar to call setup techniques known in the art for conventional gateways.

Once the inbound and outbound channels have been established and call setup is complete, TDM call data (e.g., voice data or data for other types of media) may flow across the TDM lines 35 through the established channels. For TDM call data received by the gateway 32 from the inbound channel of the TDM line 35 that is coupled to the call originating device, the source signal processing element 40 encapsulates the TDM call data into IP packets and inserts the IP address of the destination signal processing element 40 and the port identifier for the outbound channel into the header of each such packet. The source signal processing element 40 also wraps each such respective IP packet in an Ethernet frame having the MAC address of the central processing element 42. Such frame is communicated to the central processing element 42, which compares the IP address of the packet to the routing table 84 thereby determining that the packet is to be forwarded to the destination signal processing element 40. In response, the central processing element 42 wraps the IP packet in an Ethernet frame having the MAC address of the destination signal processing element 40.

Upon receiving such frame, the destination signal processing element 40 inserts the frame's IP packet into its jitter buffer 64 and eventually processes the packet by deencapsulating the packet to recover TDM call data and transmitting such data across the TDM line 35 coupled to the call destination device via the TDM channel (i.e., the outbound channel) identified by the packet's port identifier. Thus, the central processing element 42 forwards packetized TDM call data from the inbound channel in block 112 of FIG. 7 such that the TDM call is hair pinned from the inbound channel to the outbound channel.

Note that TDM call data received via the outbound channel is similarly processed such that it is hair pinned to the inbound channel. That is, the destination signal processing element 40 encapsulates such TDM call data into IP packets that have the IP address of the source signal processing element 40 and the port identifier for the inbound channel. Such packets are transmitted to the central processing element 42, which forwards the packets to the source signal processing element 40. The source signal processing element 40 buffers the packets in its jitter buffer 64 before processing the packets by deencapsulating the packets to recover the TDM call data and transmitting the TDM call data via the inbound channel across a TDM line 35 coupled to the call originating device.

Eventually, the gateway 32 will receive call signaling information from either the inbound channel or outbound channel indicating that the call is to be terminated. When this occurs, the central processing element 42 terminates the call and frees the inbound and outbound channels for use in other calls, as shown by blocks 121 and 122 of FIG. 7. Techniques for terminating TDM calls and freeing allocated channels are generally well-known and will not be described in detail herein.

Figure 7:
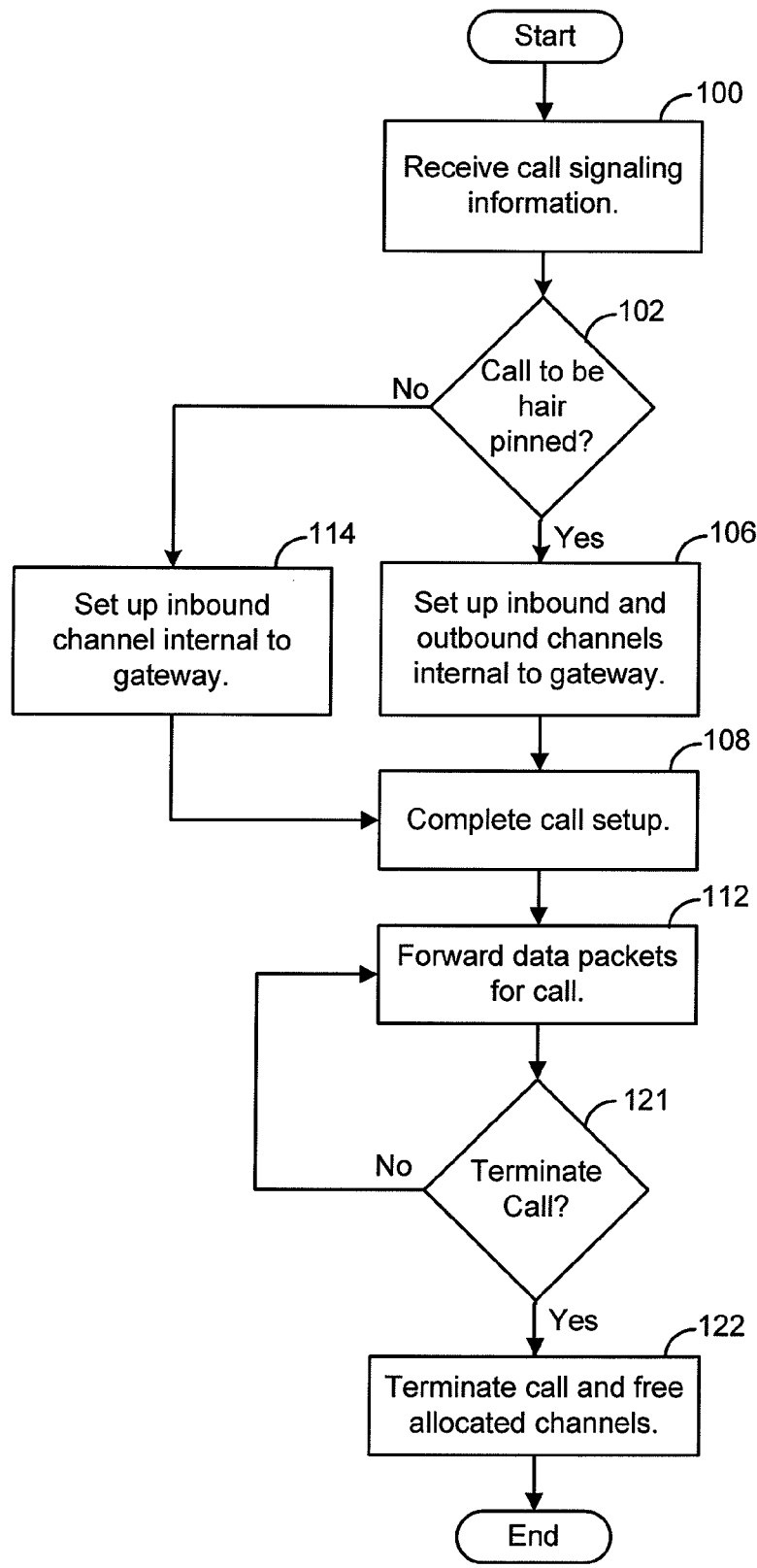
FIG. 7 is a flowchart illustrating an exemplary method employed by a gateway, such as is depicted by FIG. 3, for handling a TDM call originating from a TDM coupled to the gateway.

Note that, if the central processing element 42 determines that the call is not to be hair pinned in block 102, then the central processing element 42 sets up the inbound channel, as shown by block 114 of FIG. 7. In such case, the central processing element 42 discovers the appropriate IP address to be used for the TDM data received by the gateway 32 from the inbound channel and configures the source signal processing element 40 to packetize such TDM data using the discovered IP address. Note that such IP address does not identify any of the signal processing elements 40 but rather identifies a resource external to the gateway 32. Thus, during the TDM call, the source signal processing element 40 receives TDM call data from the inbound channel and encapsulates such data into IP packets that are forwarded by the central processing element 42 to the network interface 47 for transmission to the network 38. Packets received from the network 38 for the call are forwarded to the source signal processing element 40, which communicates the TDM data encapsulated by such packets through the inbound channel. Techniques for setting up a call through a gateway 32 that does not hair pin the call are generally well-known and will not be described in detail herein.

Accordingly, calls can be routed through the gateway between devices that are coupled to the TDM lines 35 on the TDM side of the gateway 32 and devices that are coupled to the network 38 on the network side of the gateway 32. However, when a call is between two devices that are both located on the TDM side of the gateway 32, the gateway 32 hair pins the call even when the call utilizes signal processing elements 40 and, hence, TDM channels that are asynchronous.

Now, therefore, the following is claimed:

1. A gateway for hair pinning time division multiplexing (TDM) calls across asynchronous time domains, the gateway comprising:

a network interface coupled to a non-TDM communication network;

a first signal processing element coupled to a first TDM line, the first signal processing element configured to receive a first TDM call via the first TDM line and convert data from the first TDM call into a first data packet compatible with the non-TDM communication network;

a second signal processing element coupled to a second TDM line, the second signal processing element configured to receive a second TDM call via the second TDM line and convert data from the second TDM call into a second data packet compatible with the non-TDM communication network; and control logic configured to receive the first data packet from the first signal processing element, the second data packet from the second signal processing element, and a plurality of data packets from the first signal processing element and the second signal processing element, the control logic configured to forward each of the plurality of data packets to the network interface for transmission of each of the plurality of data packets from the network interface to the non-TDM communication network, the control logic further configured to determine whether the first TDM call is to be hair pinned and to forward the first data packet directly to the second signal processing element without the gateway transmitting the first data packet to the non-TDM communication network in response to a determination that the first TDM call is to be hair pinned, the second signal processing element further configured to transmit data from the first data packet across the second TDM line, wherein the first signal processing element and the second signal processing element operate asynchronously such that a first time domain of the first signal processing element for processing TDM calls for the first TDM line is different than a second time domain of the second signal processing element for processing TDM calls for the second TDM line, wherein the first data packet is not synchronized with the second time domain at ingress to the second signal processing element, and wherein the second signal processing element is configured to adjust a timing of the first data packet to accommodate a timing difference between the timing of the first data packet and the second time domain.

2. The gateway of claim 1, further comprising a central processing element having the control logic, wherein the first signal processing element is configured to transmit the first data packet to the central processing element, and wherein the second signal processing element is configured to transmit the second data packet to the central processing element.

3. The gateway of claim 2, further comprising a housing, wherein the network interface, the first signal processing element, the second signal processing element, and the central processing element are housed within the housing.

4. The gateway of claim 2, wherein the second signal processing element comprises a jitter buffer configured to receive the first data packet.

5. The gateway of claim 1, wherein the non-TDM network comprises an inter-net Internet protocol (IP) network.

6. The gateway of claim 1, wherein the control logic is configured to cause the first signal processing element to insert into the first data packet an identifier of the second signal processing element in response to the determination.

7. A method for hair pinning time division multiplexing (TDM) calls across asynchronous time domains, the method comprising:
   providing a gateway coupled between a non-TDM network and a first TDM line and coupled between the non-TDM network and a second TDM line, the gateway having a first signal processing element coupled to the first TDM line and having a second signal processing element coupled to the second TDM line, wherein the first signal processing element and the second signal processing element are asynchronous such that a first time domain of the first signal processing element for processing TDM calls for the first TDM line is different than a second time domain of the second signal processing element for processing TDM calls for the second TDM line;
   receiving a first TDM call at the first signal processing element of the gateway via the first TDM line;
   receiving a second TDM call at the second signal processing element of the gateway via the second TDM line;
   converting, at the first signal processing element, data from the first TDM call into a first data packet compatible with the non-TDM network via the first signal processing element;
   converting, at the second signal processing element, data from the second TDM call into a second data packet compatible with the non-TDM network;
   receiving a plurality of data packets from the first signal processing element and the second signal processing element;
   transmitting each of the plurality of data packets from the gateway to the non-TDM communication network;
   determining that the first TDM call is to be hair pinned;
   forwarding the first data packet to the second signal processing element without the gateway transmitting the first data packet to the non-TDM network in response to the determining;
   receiving the first data packet at the second signal processing element while a timing of the first data packet is not synchronized with the second time domain of the second signal processing element;
   adjusting the timing of the first data packet to accommodate a timing difference between the timing of the first data packet and the second time domain; and
   communicating data from the first data packet via a TDM channel of the second TDM line.

8. The method of claim 7, wherein the non-TDM network comprises an Internet protocol (IP) network.

9. The method of claim 7, wherein the gateway has a housing, and
   wherein the first signal processing element and the second signal processing element reside within the housing.

10. The method of claim 7, further comprising:
    transmitting the first data packet and the second data packet to a central processing element of the gateway;
    transmitting the first data packet from the central processing element to the second signal processing element; and
    transmitting the second data packet from the central processing element to the non-TDM network.

11. The method of claim 10, further comprising buffering the first data packet via a jitter buffer of the second signal processing element.

12. The method of claim 7, further comprising configuring the first signal processing element to insert an identifier of the second signal processing element into the first data packet in response to the determining.

13. The method of claim 12, further comprising transmitting the first data packet from the first signal processing element to a central processing element of the gateway, wherein the forwarding comprises transmitting the first data packet from the central processing element to the second signal processing element based on the identifier inserted into the first data packet by the first processing element.

14. The method of claim 13, wherein the first data packet is transmitted from the central processing element to the second signal processing element via an Ethernet frame, wherein the method further comprises mapping the identifier inserted into the first data packet to a media access control (MAC) address of the second signal processing element, and wherein the forwarding is based on the MAC address.

15. The method of claim 7, wherein the adjusting is performed by a jitter buffer.

16. The method of claim 8, wherein the first data packet is an IP data packet.

17. The gateway of claim 1, wherein the second signal processing element comprises a jitter buffer for accommodating the timing difference between the timing of the first data packet and the second time domain.

18. The gateway of claim 5, wherein the first data packet is an IP data packet.

* * * * *